United States Patent
Koyama

(10) Patent No.: US 7,466,504 B1
(45) Date of Patent: Dec. 16, 2008

(54) LENS BARREL AND IMAGING APPARATUS

(75) Inventor: Takashi Koyama, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/153,022

(22) Filed: May 13, 2008

(30) Foreign Application Priority Data

Jul. 25, 2007 (JP) ............................. 2007-193510

(51) Int. Cl.
*G02B 7/02* (2006.01)
(52) U.S. Cl. .................... 359/819; 359/822; 359/823
(58) Field of Classification Search ................ None
See application file for complete search history.

(56) References Cited

U.S. PATENT DOCUMENTS 6,195,211 B1 * 2/2001 Iwasaki ...................... 359/694

FOREIGN PATENT DOCUMENTS

JP 2000-266981 9/2000

* cited by examiner

*Primary Examiner*—Timothy J Thompson
(74) *Attorney, Agent, or Firm*—Rader Fishman & Grauer PLLC; Ronald P. Kananen

(57) ABSTRACT

A lens barrel in which a plurality of movable units, each including a group of lenses, are moved in the optical axis direction when a cam ring is rotated relative to a stationary ring around the optical axis, is disclosed. The lens barrel includes a first movable unit including a first group of lenses and a first moving frame having a roller support hole formed therein; a second movable unit including a second group of lenses and a second moving frame disposed inside the first moving frame; a pressing roller supported in the roller support hole in the first moving frame; a biasing spring attached to the outer surface of the first moving frame; and a receive roller supported by the first or second moving frame.

11 Claims, 9 Drawing Sheets

LENS BARREL AND IMAGING APPARATUS

CROSS REFERENCES TO RELATED APPLICATIONS

The present invention contains subject matter related to Japanese Patent Application JP 2007-193510 filed in the Japanese Patent Office on Jul. 25, 2007, the entire contents of which are incorporated herein by reference.

BACKGROUND OF THE INVENTION

1. Field of the Invention

The present invention relates to the technical field of a lens barrel and an imaging apparatus, particularly the technological field in which a biasing spring presses a pressing roller supported by a first moving frame against a second moving frame to prevent a group of lenses from being inclined to the optical axis so as to improve, for example, optical performance.

2. Description of the Related Art

Some imaging apparatuses, such as a still camera and a video camera, include a lens barrel having a plurality of groups of lenses movable in the optical axis direction for focusing and zooming.

Examples of such lens barrels include a lens barrel assembled as part of the imaging apparatus to the apparatus body in advance, and a removable lens barrel attached to the apparatus body, a so-called exchangeable lens.

In recent years, imaging apparatuses tend to be smaller in body size and larger in pixel size. Being smaller in body size and larger in pixel size makes the impact of lens manufacturing error on image quality larger, resulting in the problem of increased difficulty in manufacturing.

To address the problem, two groups of lenses having opposite sensitivities are secured in a lens holder to form a movable unit in an imaging apparatus of related art. Even when the movable unit is inclined to the optical axis, the errors of the two groups of lenses are cancelled because they have opposite sensitivities, thus reducing the impact on the image quality and the difficulty in manufacturing.

However, when such two groups of lenses form a movable unit, each of the groups of lenses is not independently moved in the optical axis direction. The design specifications, such as the zoom magnification, become restricted, resulting in the problem of a smaller degree of design freedom.

To solve such two problems of an increased difficulty in manufacture and a smaller degree of design freedom, there is an imaging apparatus capable of moving a movable unit in the optical axis direction with the movable unit pressed against a predetermined member (see JP-A-2000-266981, for example).

In the imaging apparatus described in JP-A-2000-266981, which is configured in such a way that the movable unit having a group of lenses is moved in the optical axis direction when a cam barrel rotates relative to the stationary barrel, a rotation output member that exerts a rotary drive force on the cam barrel is biased in a direction perpendicular to the optical axis so as to press the cam barrel against the stationary barrel.

In such a configuration, the cam barrel pressed against the stationary barrel prevents the group of lenses provided in the movable unit from being inclined to the optical axis, so that the difficulty in manufacturing can be reduced and the rotation of the cam barrel can move a plurality of movable units independently, resulting in an improvement in the degree of design freedom.

SUMMARY OF THE INVENTION

In the imaging apparatus described in JP-A-2000-266981, however, since the cam barrel is pressed against the stationary barrel when rotated to move the movable unit in the optical axis direction, the friction between the rotating cam barrel and the stationary barrel is large, and hence the cam barrel will not move smoothly in a disadvantageous manner.

On the other hand, when the biasing force that presses the cam barrel against the stationary barrel is reduced to ensure the smoothness of the motion, the group of lenses is likely to be inclined to the optical axis of the group of lenses in an inconvenient manner.

Thus, it is desirable to overcome the problems described above, improve the optical performance and ensure the smoothness of motion at the same time.

According to an embodiment of the invention, there are provided: a lens barrel and an imaging apparatus including a first movable unit having the first group of lenses and a first moving frame that holds the first group of lenses, the first moving frame having a roller support hole formed therein; a second movable unit including a second group of lenses and a second moving frame that holds the second group of lenses, the second moving frame disposed inside the first moving frame; a pressing roller supported in the roller support hole in the first moving frame in such a way that the pressing roller is rotatable around an axis perpendicular to the optical axis, the pressing roller being rotated when the first or second movable unit is moved in the optical axis direction; a biasing spring attached to the outer surface of the first moving frame, the biasing spring pressing the pressing roller against the outer surface of the second moving frame; and a receive roller supported by the first or second moving frame in such a way that the receive roller is rotatable around an axis perpendicular to the optical axis, where the receive roller is being pressed by the biasing force of the biasing spring against the second or first moving frame and being rotated when the first or second moving frame is moved in the optical axis direction.

Therefore, in the lens barrel and the imaging apparatus, when the first and second movable units are moved in the optical axis direction, the pressing roller pressed against the second moving frame and the receive roller pressed against the first or second moving frame are rotated.

In a lens barrel, according to an embodiment of the invention, a plurality of movable units, each including a group of lenses, is moved in the optical axis direction when a cam ring is rotated relative to the stationary ring around the optical axis. The lens barrel includes a first movable unit including a first group of lenses and a first moving frame that holds the first group of lenses, the first moving frame having a roller support hole formed therein; a second movable unit including a second group of lenses and a second moving frame that holds the second group of lenses, the second moving frame disposed inside the first moving frame; a pressing roller supported in the roller support hole in the first moving frame in such a way that the pressing roller is rotatable around an axis perpendicular to the optical axis, having the pressing roller being rotated when the first or second movable unit is moved in the optical axis direction; a biasing spring attached to the outer surface of the first moving frame, with the biasing spring pressing the pressing roller against the outer surface of the second moving frame; and a receive roller supported by the first or second moving frame in such a way that the receive roller is rotatable around an axis perpendicular to the optical axis, with the receive roller being pressed by the biasing force of the biasing spring against the second or first moving frame and being rotated when the first or second moving frame is moved in the optical axis direction.

Therefore, since the first and second moving frames are moved in the optical axis direction while the pressing roller and the receive roller are rotated, it is possible to ensure a smooth motion of the first and second moving frames, reduce the inclination of the first and second movable units with respect to the optical axis, and hence improve the image quality.

In the lens barrel according to the embodiment of the invention, the first and second groups of lenses have sensitivities of opposite directions but substantially the same magnitude. Therefore, even when the first and second movable units are slightly inclined to the optical axis, the inclination is unlikely to degrade the image quality.

In the lens barrel according to the embodiment of the invention, the first or second moving frame has a guide hole against which the rotating receive roller is pressed, the guide hole extending in the optical axis direction and guiding the motion of the second or first moving frame in the optical axis direction. Therefore, no other dedicated guiding means is necessary, and hence the mechanism can be simplified.

In the lens barrel, according to the embodiment of the invention, the pressing roller includes a cylindrical roller portion that comes into contact with the second moving frame and a pair of shafts jutting out in opposite directions from the central portions of the side surfaces of the roller portion, and the biasing spring comes into contact with the outer circumferential surfaces of the pair of shafts so that the pressing roller is biased toward the second moving frame. Therefore, the biasing spring does not prevent the rotation of the pressing roller unduly and the loss due to the sliding motion is small accordingly. It is thus possible to ensure a smooth rotation of the pressing roller.

In the lens barrel, according to the embodiment of the invention, the pressing roller includes disk-shaped slidable projections jutting out in opposite directions from the side surfaces of the roller portion, each of the slidable projections being slidable on an end of the opening of the roller support hole in the first moving frame. The amount of projection of the slidable projection from the roller portion is smaller than the amount of projection of the shaft, with the diameter of the slidable projection being smaller than the diameter of the roller portion and greater than the diameter of the shaft. Therefore, the areas that come into contact with the ends of the opening of the roller support hole are small when the pressing roller rotates and the loss due to the sliding motion is small accordingly. It is thus possible to ensure a smooth rotation of the pressing roller.

In the lens barrel, according to the embodiment of the invention, the biasing spring includes a first flat spring and a second flat spring, and the first and second flat springs are overlaid in the thickness direction. Therefore, the spring constant of the biasing spring is larger than that of a flat spring having the total thickness of the first and second flat springs biasing spring is unlikely to be plastically deformed, and hence the functionality of the biasing spring can be improved.

In the lens barrel, according to the embodiment of the invention, the cam ring is shaped into a substantially cylindrical form, with the first moving frame including a cylindrical portion and a flat portion connected to the cylindrical portion in the circumferential direction. The portion of the first moving frame that includes at least the flat portion is disposed inside the cam ring, and the flat portion is a spring attachment portion to which the biasing spring is attached. It is therefore possible to provide a sufficient space for disposing the biasing springs without increasing the size of the lens barrel.

In the lens barrel, according to the embodiment of the invention, the biasing spring includes a first flat spring and a second flat spring, with the outer shape of being smaller than the outer shape of the first flat spring. The first flat spring is disposed in such a way that the first flat spring is in contact with the spring attachment portion, and the second flat spring is overlaid on the first flat spring in the thickness direction. Therefore, the biasing spring does not take up a large area and fits in a space created between the flat portion and the inner surface of the cam ring, resulting in effective use of the layout space.

In the lens barrel, according to the embodiment of the invention, a plurality of receive rollers is provided at locations spaced apart in the optical axis direction. Therefore, the first and second movable units are unlikely to be inclined to the optical axis in the optical axis direction. It is thus possible to improve the stability of the motion of the first and second movable units and hence the image quality.

In the lens barrel according to the embodiment of the invention, a plurality of receive rollers is provided at locations spaced apart in a direction perpendicular to the optical axis. Therefore, the first and second movable units are unlikely to be inclined to the optical axis in a direction perpendicular to the optical axis. It is thus possible to improve the stability of the motion of the first and second movable units and hence the image quality.

According to an embodiment of the invention, there is provided an imaging apparatus including a lens barrel in which a plurality of movable units, each including a group of lenses, is moved in the optical axis direction when a cam ring is rotated relative to a stationary ring around the optical axis. The lens barrel includes a first movable unit including a first group of lenses and a first moving frame that holds the first group of lenses, the first moving frame having a roller support hole formed therein, a second movable unit including a second group of lenses and a second moving frame that holds the second group of lenses, the second moving frame disposed inside the first moving frame, a pressing roller supported in the roller support hole in the first moving frame in such a way that the pressing roller is rotatable around an axis perpendicular to the optical axis, the pressing roller being rotated when the first or second movable unit is moved in the optical axis direction, a biasing spring attached to the outer surface of the first moving frame, the biasing spring pressing the pressing roller against the outer surface of the second moving frame, and a receive roller supported by the first or second moving frame in such a way that the receive roller is rotatable around an axis perpendicular to the optical axis, with the receive roller being pressed by the biasing force of the biasing spring against the second or first moving frame, and being rotated when the first or second moving frame is moved in the optical axis direction.

Therefore, since the first and second moving frames are moved in the optical axis direction while the pressing roller and the receive roller are rotated, it is possible to ensure a smooth motion of the first and second moving frames, reduce the inclination of the first and second movable units with respect to the optical axis, and hence improve the image quality.

DESCRIPTION OF THE PREFERRED EMBODIMENTS

The best mode for carrying out a lens barrel and an imaging apparatus according to embodiments of the invention will be described below with reference to the accompanying drawings.

The best mode described below is an imaging apparatus according to an embodiment of the invention applied to a still camera and a lens barrel according to an embodiment of the invention applied to a lens barrel provided in the still camera. The scope of the invention, however, is not limited to a still camera or a lens barrel provided in the still camera. For example, the best mode is widely applicable to various imaging apparatuses incorporated in a video camera and other apparatuses or a lens barrel provided in such various imaging apparatuses.

In the following description, the front-rear, up-down, and right-left directions are defined relative to an user who uses a still camera to acquire an image. That is, the subject side is the front side, and the camera user side is the rear side.

The front-rear, up-down, and right-left directions described below are defined for convenience of explanation, and the directions defined as described above are not necessarily used in implementing the invention.

Figure 1:
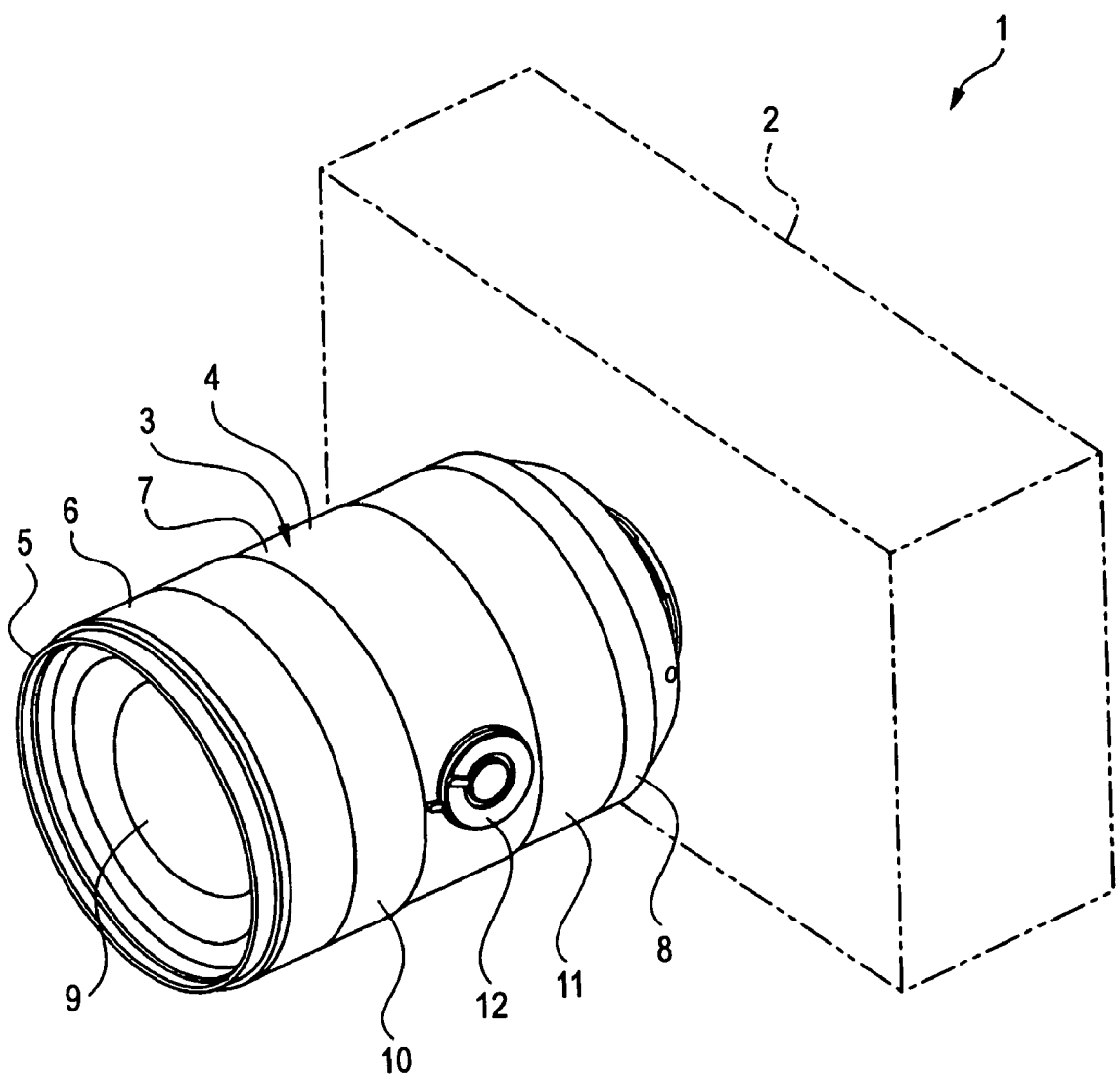
FIG. 1, along with FIGS. 2 to 9, shows the best mode of a lens barrel and an imaging apparatus according to an embodiment of the invention, and is a perspective view of the imaging apparatus.

An imaging apparatus (still camera) 1 includes an apparatus body 2 and a removable lens barrel 3 as a so-called interchangeable lens attached to the front surface 2a of the apparatus body 2, as shown in FIG. 1.

The lens barrel 3 is not limited to an interchangeable lens, but may be preassembled to the apparatus body 2. The lens barrel 3 may be a so-called collapsible lens that retracts into the apparatus body 2 when not used to acquire an image and juts out forward from the apparatus body 2 when used to acquire an image.

Figure 2:
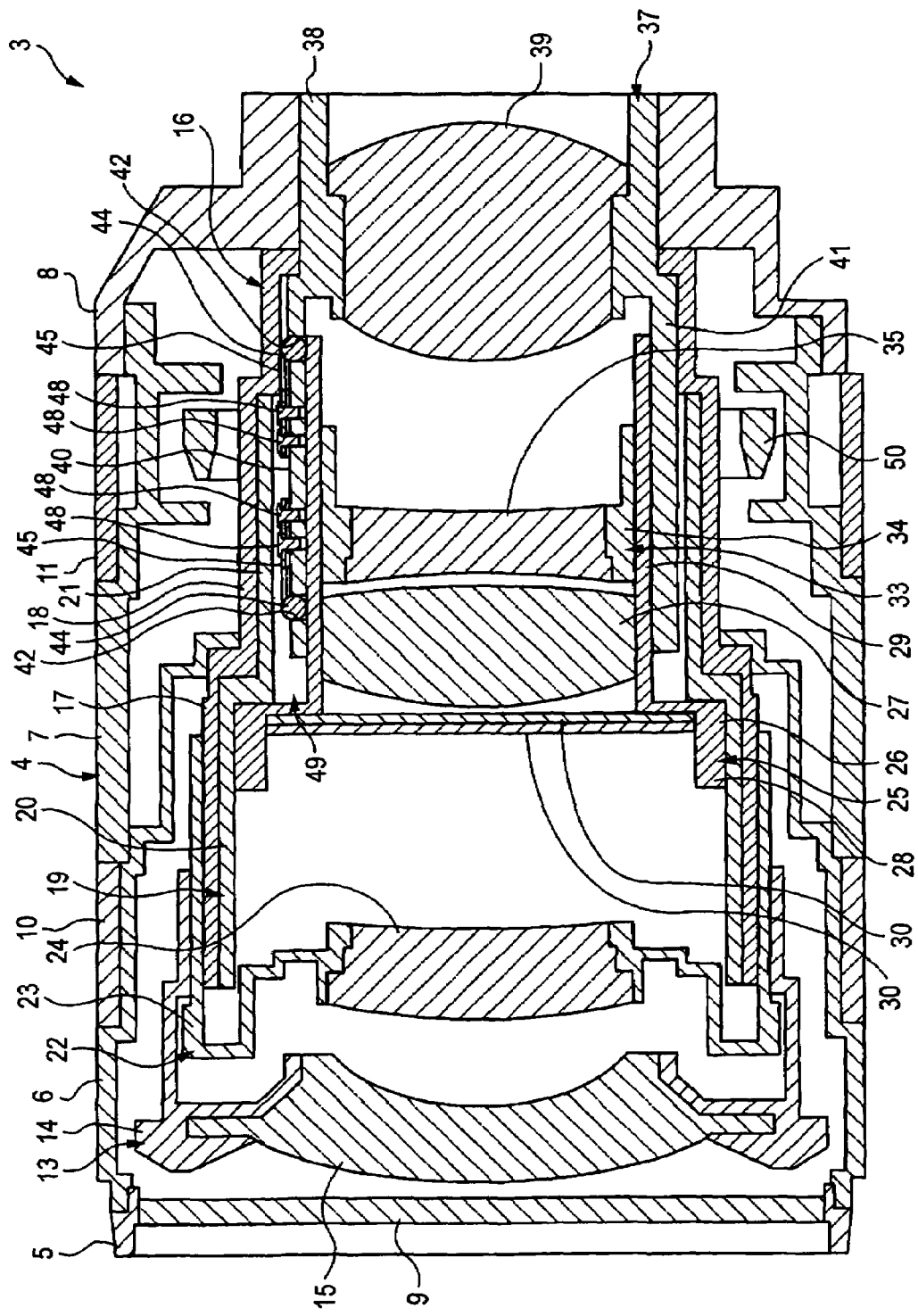
FIG. 2 is a schematic enlarged cross-sectional view of the lens barrel.

The lens barrel 3 includes, as shown in FIGS. 1 and 2, various necessary portions disposed or supported inside and outside a housing 4, and the housing 4 includes a ring-shaped frame 5, a first lens barrel portion 6, a second lens barrel portion 7, and a third lens barrel portion 8, connected in this order in the front-to-rear direction of the lens barrel 3.

A filter 9 fits in the ring-shaped frame 5 and is attached thereto.

A focus ring 10 is rotatably supported by the first lens barrel portion 6 at an intermediate portion thereof in the front-rear direction. Rotating the focus ring 10 in a manual focus mode allows focusing during image acquisition.

A zoom ring 11 is rotatably supported at the rear end of the second lens barrel portion 7. Rotating the zoom ring 11 allows zooming during image acquisition.

A switch dial 12 is disposed on the outer circumferential surface of the second lens barrel portion 7. Operating the switch dial 12 allows mode switching between an autofocus mode for autofocusing and a manual focus mode for manual focusing.

A stationary unit 13 is disposed in the housing 4 immediately behind the filter 9 (see FIG. 2). The stationary unit 13 includes a lens holder 14 and a group of imaging lenses 15 held in the lens holder 14.

The lens barrel 3 includes not only the group of imaging lenses 15 but also various types of groups of lenses, which will be described later. Each of the groups of lenses may be formed of a single lens or a combination of a plurality of lenses.

Figure 3:
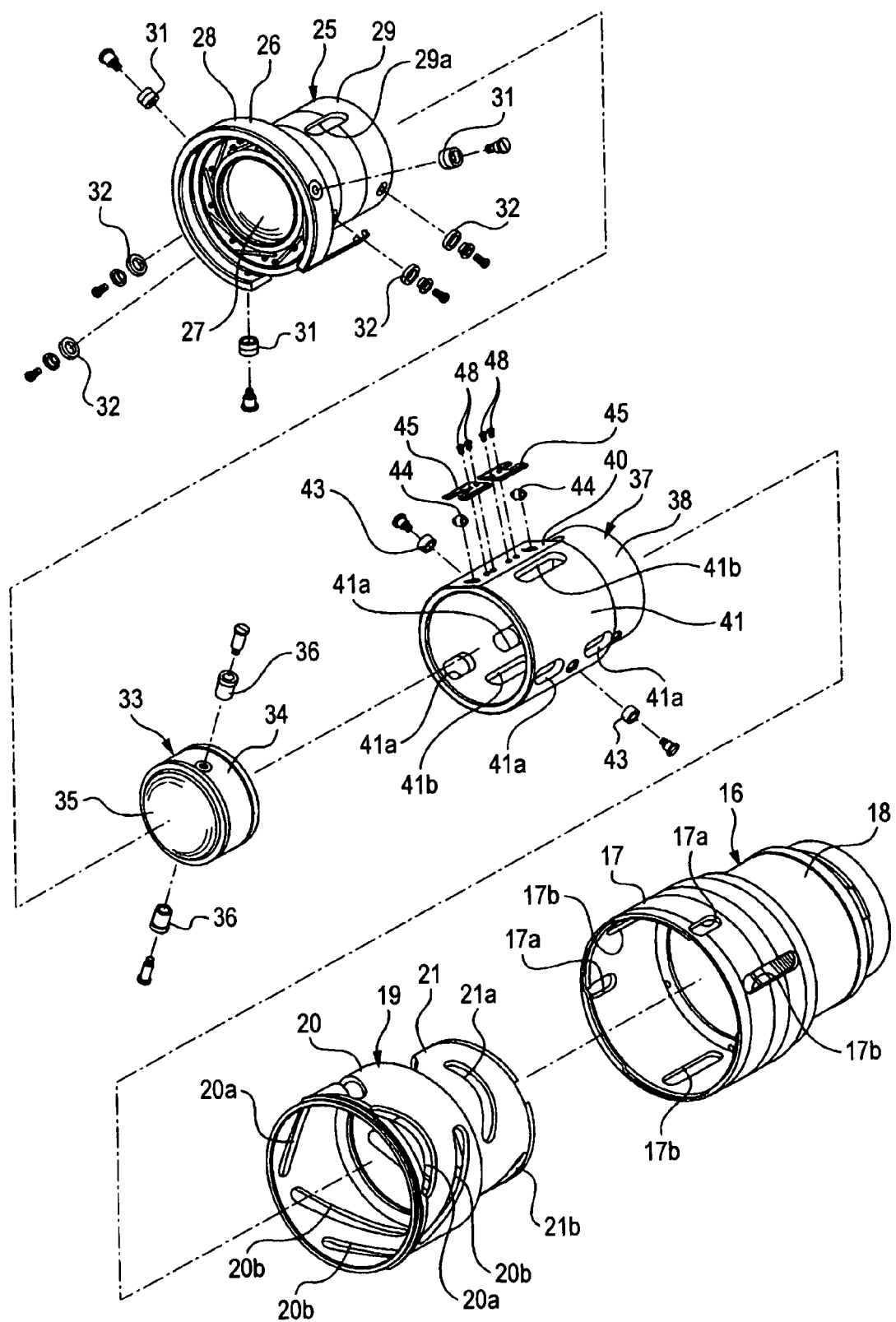
FIG. 3 is a perspective exploded view showing part of the lens barrel.

A stationary ring 16 is disposed and fixed in the housing 4 (see FIGS. 2 and 3). The stationary ring 16 is shaped into a substantially cylindrical form that is elongated in the front-rear direction, including a first cylindrical portion 17 located on the front side and a second cylindrical portion 18 located on the rear side and having an outer diameter slightly smaller than that of the first cylindrical portion 17. The rear end of the stationary ring 16 is fixed to the third lens barrel portion 8.

Translation guide holes for the first group 17a and 17a spaced apart in the circumferential direction and extending in the front-rear direction are formed in the first cylindrical portion 17. Translation guide holes for the second group 17b, 17b, and 17b equally spaced apart in the circumferential direction and extending in the front-rear direction are formed in the first cylindrical portion 17.

A cam ring 19 is supported by the stationary ring 16 in such a way that the cam ring 19 is rotatable around the optical axis. The cam ring 19 is disposed inside the stationary ring 16 and includes a first tubular portion 20 located on the front side, and a second tubular portion 21 located on the rear side having an outer diameter slightly smaller than that of the first tubular portion 20.

Cam holes for the first group 20a and 20a and cam holes for the second group 20b, 20b, and 20b spaced apart in the circumferential direction are formed in the first tubular portion 20. Cam holes for the third group 21a and 21a, and cam holes for the fourth group 21b and 21b spaced apart in the circumferential direction are formed in the second tubular portion 21.

A first-group movable unit 22 is supported in the housing 4 in such a way that the first-group movable unit 22 is movable in the optical axis direction (front-rear direction). The first-group movable unit 22 includes a first-group moving frame 23 and a group of lenses 24 held in the first-group moving frame 23.

Two cam pins (not shown), each rotatable around an axis perpendicular to the optical axis, are provided in the first-group moving frame 23. The two cam pins slidably engage with the cam holes for the first group 20a and 20a in the cam ring 19 and the translation guide holes for the first group 17a and 17a in the stationary ring 16. Therefore, when the cam ring 19 rotates, the cam pins in the first-group movable unit 22 change their positions relative to the cam holes for the first group 20a and 20a, and follow the translation guide holes for the first group 17a and 17a. The first-group movable unit 22 thus moves in the optical axis direction.

A second-group movable unit 25 is located behind the first-group movable unit 22 and supported in the housing 4 in such a way that the second-group movable unit 25 is movable in the optical axis direction. The second-group movable unit 25 includes a second-group moving frame 26 and a group of lenses 27.

Figure 4:
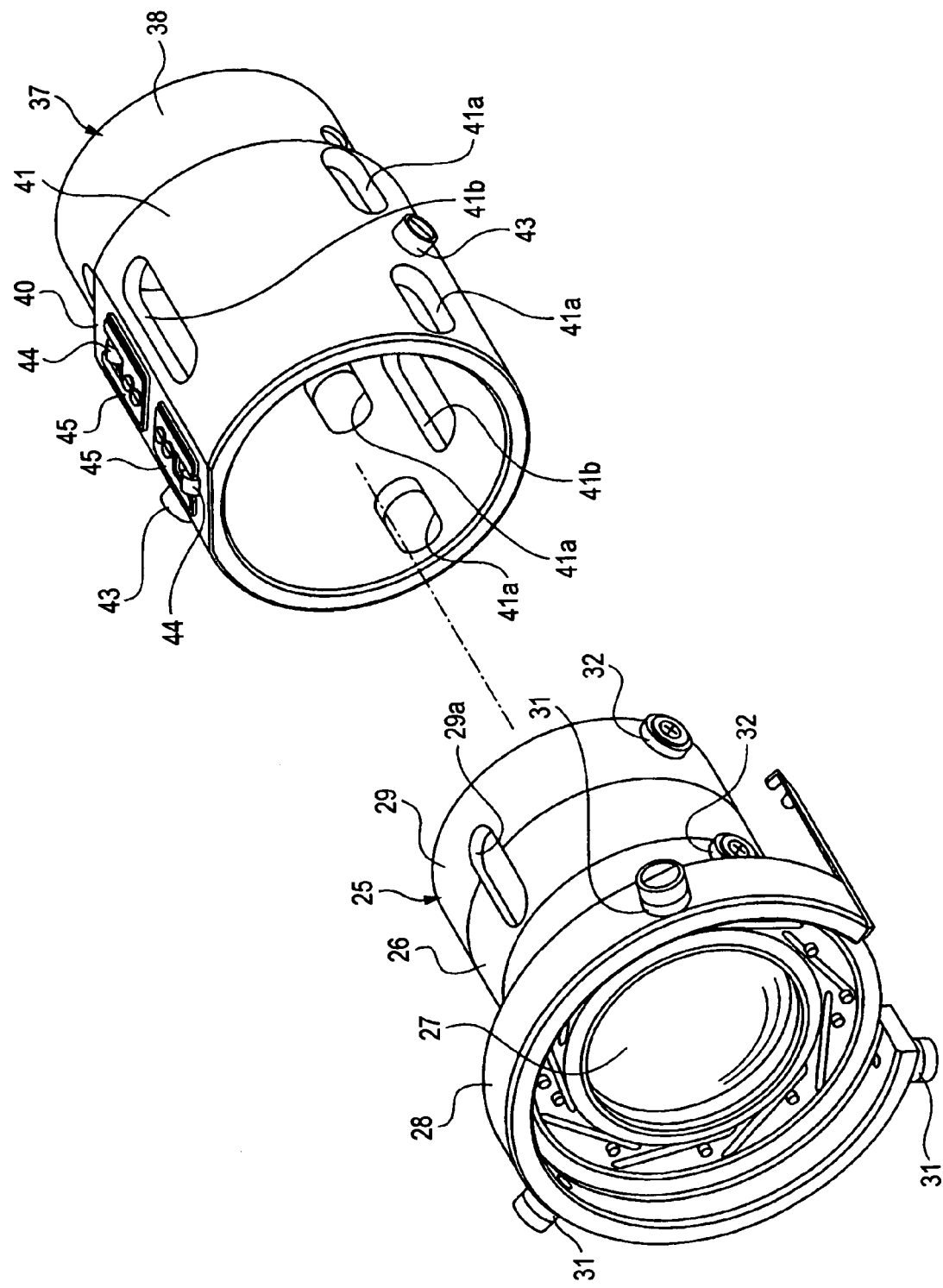
FIG. 4 is an enlarged perspective view showing a second-group movable unit and a fourth-group movable unit as being separate from each other.

The second-group moving frame 26 includes, as shown in FIGS. 2 to 4, a first substantially annular portion 28 located on the front side, and a substantially cylindrical second annular portion 29 located on the rear side having an outer diameter slightly smaller than that of the first annular portion 28.

Two open/close blades 30 and 30 are supported in the first annular portion 28, as shown in FIG. 2, in such a way that the blades can be opened and closed. The open/close blades 30 and 30 form an iris mechanism. Rotatable cam pins 31, 31, and 31 spaced apart in the circumferential direction, each rotating around an axis perpendicular to the optical axis, are supported on the outer circumferential surface of the first annular portion 28, as shown in FIGS. 3 and 4.

The group of lenses 27 is held in the second annular portion 29 (see FIG. 2). Translation guide holes for the third group 29a and 29a, each extending in the front-rear direction, are formed at positions close to the ends of the top and bottom of the second annular portion 29, as shown in FIGS. 3 and 4.

Receive rollers 32, 32, . . . spaced apart in the circumferential direction are supported by the second annular portion 29 in such a way that the receive rollers 32, 32, . . . can rotate. Each of the receive rollers 32, 32, . . . rotates around an axis perpendicular to the optical axis. For example, a pair of receive rollers 32 and 32 are provided separately on the right and left sides, and the two right and left receive rollers 32 and 32 are spaced apart in the front-rear direction.

The rotatable cam pins 31, 31, and 31 attached to the first annular portion 28 slidably engage with the cam holes for the second group 20b, 20b, and 20b in the cam ring 19 and the translation guide holes for the second group 17b, 17b, and 17b in the stationary ring 16. Therefore, when the cam ring 19 rotates, the rotatable cam pins 31, 31, and 31 change their positions relative to the cam holes for the second group 20b, 20b, and 20b, and follows the translation guide holes for the second group 17b, 17b, and 17b. The second-group movable unit 25 thus moves in the optical axis direction.

In the housing 4, as shown in FIGS. 2 and 3, a third-group movable unit 33 is supported in the second-group movable unit 25 in such a way that the third-group movable unit 33 is movable in the optical axis direction. The third-group movable unit 33 includes a third-group moving frame 34 and a group of lenses 35.

Rotatable cam pins 36 and 36, each rotating around an axis perpendicular to the optical axis, are supported on the outer circumferential surface of the third-group moving frame 34 at positions close to the ends of the top and bottom thereof.

A fourth-group movable unit 37 is supported in the housing 4 in such a way that the fourth-group movable unit 37 is movable in the optical axis direction (see FIG. 2). The fourth-group movable unit 37 includes a fourth-group moving frame 38 and a group of lenses 39.

The fourth-group moving frame 38 is shaped into a substantially cylindrical form elongated in the front-rear direction, as shown in FIGS. 2 to 4. The portion of the fourth-group moving frame 38 that does not include the rear end portion covers the second-group moving frame 26 from the outside, and that portion is disposed inside the cam ring 19.

The group of lenses 39 in the fourth-group movable unit 37 and the group of lenses 27 in the second-group movable unit 25 are sensitive enough to likely degrade the MTF (Modulation Transfer Factor) due to an inclination of these groups of lenses with respect to the optical axis. The group of lenses 39 in the fourth-group movable unit 37 and the group of lenses 27 in the second-group movable unit 25 have sensitivities of opposite directions but substantially the same magnitude. Therefore, when the group of lenses 27 and the group of lenses 39 are inclined at the same time to the optical axis by the same angle, the sensitivities cancel each other and hence the image quality likely will not be degraded.

A flat portion 40 that faces upward is formed on the top of the fourth-group moving frame 38, except the rear end portion (see FIGS. 3 and 4). In the portion of the fourth-group moving frame 38 that does not include the rear end portion, the portion, except the flat portion 40, is formed as a cylindrical portion 41.

Figure 5:
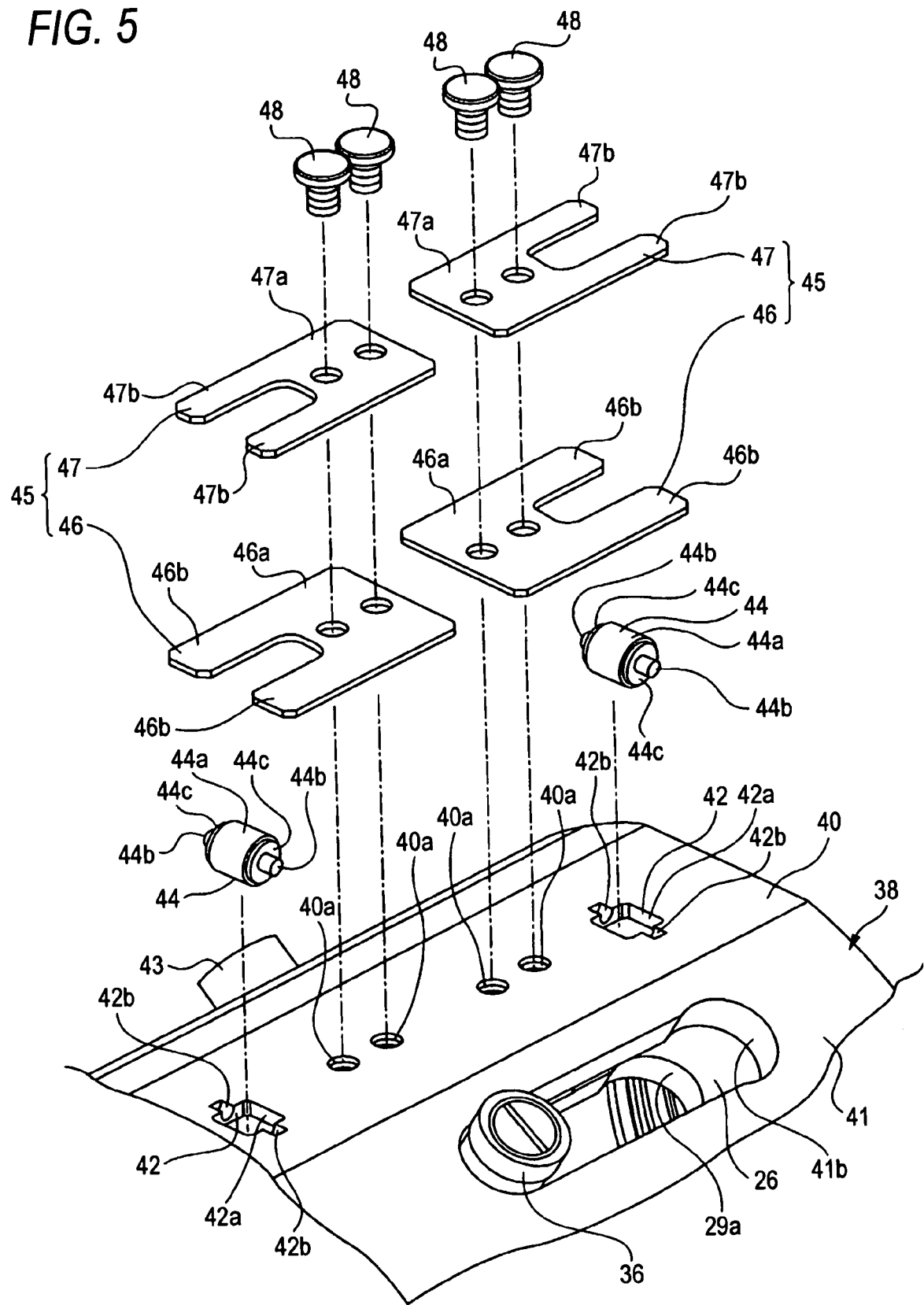
FIG. 5 is an enlarged, exploded perspective view showing a flat portion of the fourth-group movable unit and various portions disposed on the flat portion.

Roller support holes 42 and 42 spaced apart in the front-rear direction are formed in the flat portion 40, as shown in FIG. 5, in such a way that the holes pass through the flat portion 40 in the up-down direction. The roller support hole 42 includes a first portion 42a with a large rectangular opening area and second portions 42b and 42b extending on the same level from the right and left ends of the first portion 42a rightward and leftward, respectively. The second portions 42b and 42b are connected to the central portions, in the front-rear direction, of the right and left ends of the first portion 42a, and each of the second portions 42b and 42b has an opening area smaller than that of the first portion 42a.

Attachment screw holes 40a, 40a, . . . spaced apart in the front-rear direction are formed in the flat portion 40 between the roller support holes 42 and 42.

Guide holes for the second group 41a, 41a, . . . extending in the front-rear direction are formed in the cylindrical portion 41 (see FIGS. 3 and 4). For example, a pair of guide holes for the second group 41a and 41a is provided separately on the right and left sides, and the right and left two guide holes for the second group 41a and 41a are spaced apart in the front-rear direction. Guide holes for the third group 41b and 41b, each extending in the front-rear direction, are formed in the cylindrical portion 41 at positions close to the ends of the top and bottom thereof.

Rotatable cam pins 43 and 43 spaced apart in the circumferential direction, each rotating around an axis perpendicular to the optical axis, are supported by the cylindrical portion 41.

The third-group movable unit 33 is assembled in such a way that the rotatable cam pins 36 and 36 are inserted through the translational guide holes for the third group 29a and 29a in the second-group moving frame 26 and the guide holes for the third group 41b and 41b in the fourth-group moving frame 38, then slidably engages with the cam holes for the third group 21a and 21a in the cam ring 19. Therefore, when the cam ring 19 rotates, the rotatable cam pins 36 and 36 change their positions relative to the cam holes for the third group 21a and 21a, and follow the translation guide holes for the third group 29a and 29a and the guide holes for the third group 41b and 41b. The third-group movable unit 33 thus moves in the optical axis direction.

Figure 6:
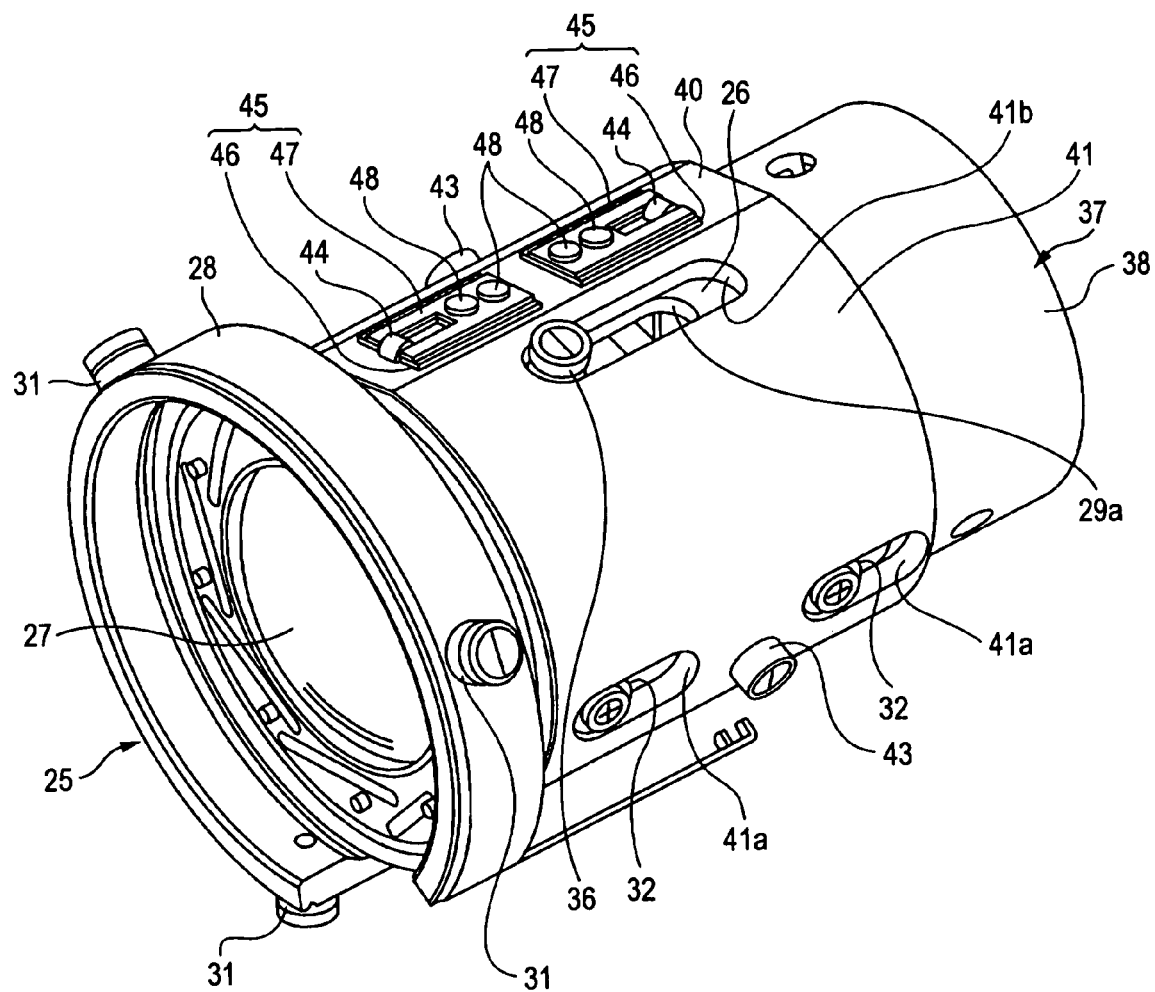
FIG. 6 is an enlarged perspective view showing the second-group movable unit and the fourth-group movable unit.

The second-group movable unit 25 is assembled, as described above, in such a way that the rotatable cam pins 31, 31, and 31 slidably engage with the cam holes for the second group 20b, 20b, and 20b in the cam ring 19 and the translational guide holes for the second group 17b, 17b, and 17b in the stationary ring 16. The receive rollers 32, 32, . . . of the second-group movable unit 25 slidably engage with the guide holes for the second group 41a, 41a, . . . in the fourth-group moving frame 38, as shown in FIG. 6.

Pressing rollers 44 and 44 are rotatably supported in the roller support holes 42 and 42 formed in the fourth-group moving frame 38 (see FIGS. 4 and 5). Each of the pressing rollers 44 and 44 rotates around an axis perpendicular to the optical axis.

The pressing roller 44 includes a laterally-elongated, cylindrical roller portion 44a and a pair of shafts 44b and 44b jutting out in opposite directions from the central portions of the right and left side surfaces of the roller portion 44a. Slidable projections 44c and 44c are provided on the right and left side surfaces of the roller portion 44a of the pressing roller 44, the slidable projections 44c and 44c jutting out in the same directions as the respective shafts 44b and 44b. The slidable projection 44c is shaped into a thin annular form. The amount of projection of the slidable projection 44c from the roller portion 44a is smaller than the amount of projection of the shaft 44b, and the diameter of the slidable projection 44c is smaller than the diameter of the roller portion 44a but greater than the diameter of the shaft 44b.

The roller portion 44a and the slidable projections 44c of the pressing roller 44 are inserted in the first portion 42a of the roller support hole 42, and the shafts 44b and 44b of the pressing roller 44 are inserted in the second portions 42b and 42b of the roller support holes 42. The roller portion 44a comes into contact with the upper surface of the second-group moving frame 26.

Biasing springs 45 and 45 are attached to the flat portion 40 of the fourth-group moving frame 38 (see FIG. 5). The flat portion 40 therefore serves as a spring attachment portion. The biasing spring 45 includes a first flat spring 46 and a second flat spring 47 having different sizes but substantially the same shape, the first and second flat springs 46 and 47 overlaid in the thickness direction.

The first flat spring 46 located on the lower side includes a surface to be attached 46a and biasing portions 46b and 46b jutting out forward or rearward from the right and left portions of an end of the surface to be attached to 46a. The second flat spring 47 located on the upper side includes a surface to be attached 47a and biasing portions 47b and 47b jutting out forward or rearward from the right and left portions of an end of the surface to be attached to 47a. The width of the second flat spring 47 in the right-left direction is smaller than the width of the first flat spring 46 in the right-left direction.

Figure 7:
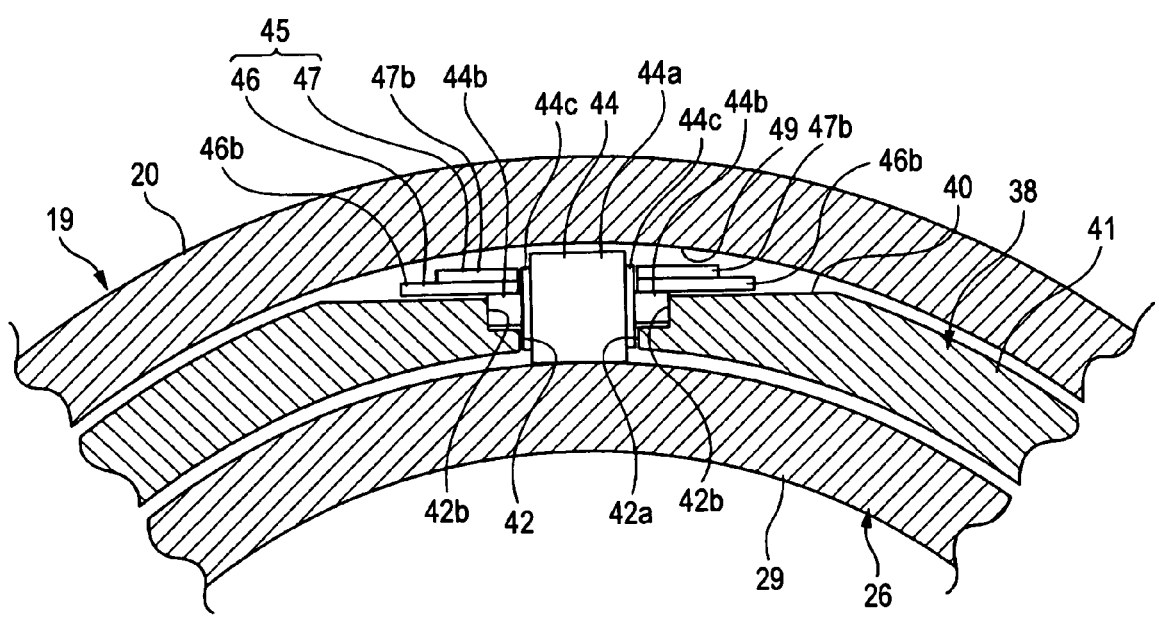
FIG. 7 is an enlarged, front cross-sectional view showing part of the portion in which biasing springs are disposed.

The overlaid first and second flat springs 46 and 47 are attached as shown in FIGS. 6 and 7 in such a way that the surfaces 46a and 47a are attached to the flat portion 40 with attachment screws 48 and 48. The attachment screws 48 and 48 are screwed into the attachment screw holes 40a and 40a formed in the flat portion 40.

After the biasing spring 45 is attached to the flat portion 40, the overlaid biasing portions 46b and 46b and biasing portions 47b and 47b come into contact with the shafts 44b and 44b of the pressing roller 44 from above, so that the pressing roller 44 is biased downward and the roller portion 44a is pressed against the upper surface of the second-group moving frame 26.

Since the biasing spring 45 is formed of the first and second flat springs 46 and 47 overlaid in the thickness direction, the spring constant of the biasing spring 45 is larger than that of a flat spring. Having the total thickness of the first and second flat springs 46 and 47 so that the biasing spring 45 is unlikely to be plastically deformed, and hence the functionality of the biasing spring 45 can be improved.

A space 49 is created between the flat portion 40 of the fourth-group moving frame 38, which is formed adjacent to the cylindrical portion 41, and the inner surface of the cam ring 19 (see FIG. 7). The formation of the flat portion 40 of the fourth-group moving frame 38 can thus provide a sufficient space for disposing the biasing springs 45 without increasing the size of the lens barrel 3.

Further, since the second flat spring 47 having a smaller width in the right-left direction is overlaid on the first flat spring 46 and thus configured biasing spring 45 is attached to the flat portion 40, the biasing spring 45 does not take up a large area and fits in the space 49 created between the flat portion 40 and the inner surface of the cam ring 19, resulting in an effective use of the layout space.

Moreover, when the biasing springs 45 and 45 are attached to the flat portion 40 with the attachment screws 48, 48, . . . , the attachment screws 48, 48, . . . are spaced apart in the front-rear direction in the central portion of the flat portion 40 in the right-left direction. The attachment screws 48, 48, . . . are thus disposed in the largest space in the up-down direction in the space 49, resulting in an effective use of the layout space.

Figure 8:
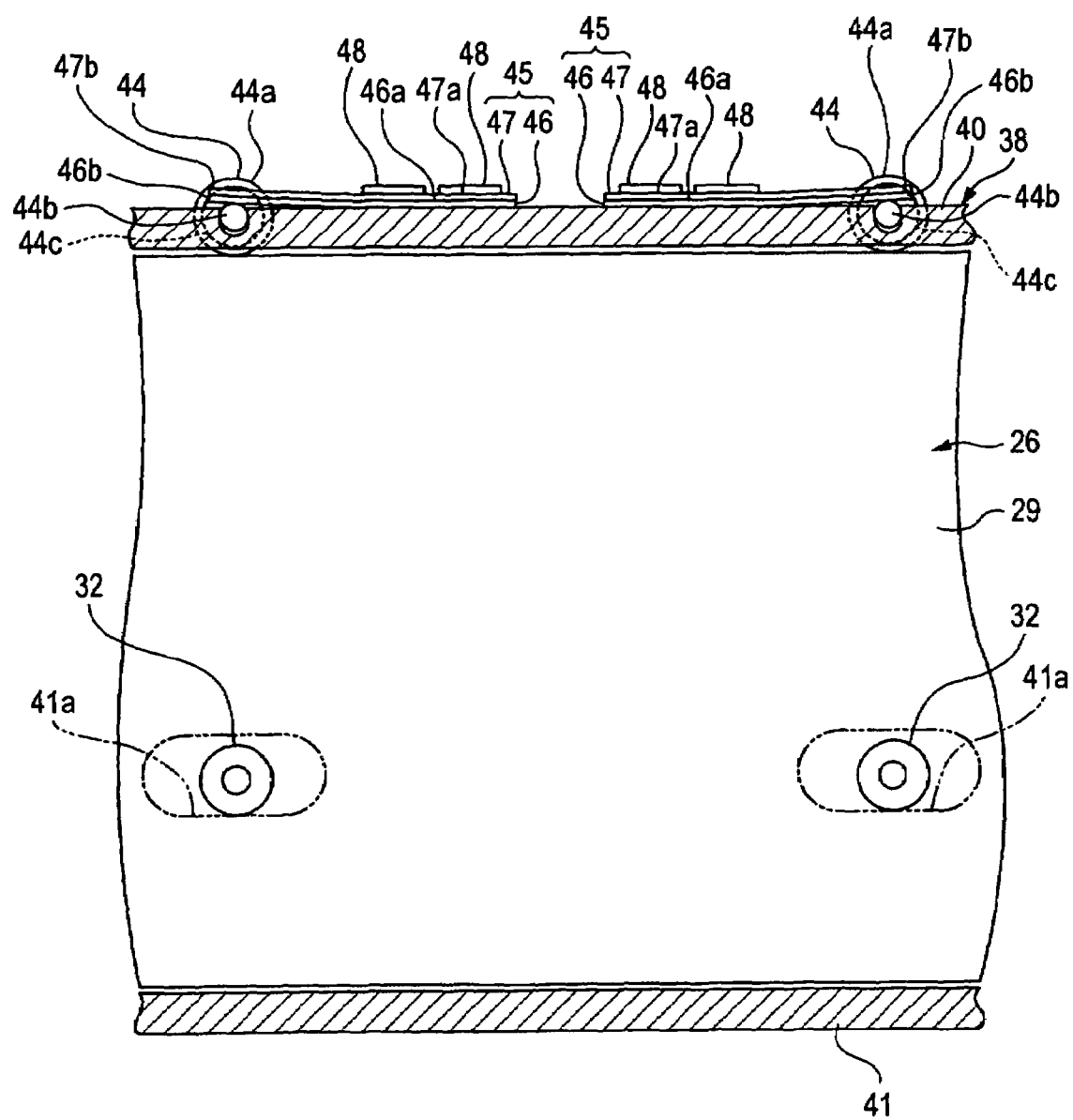
FIG. 8 is a conceptual view showing the state in which pressing rollers are biased with biasing springs and receive rollers are pressed against the ends of the openings of guide holes for the second group.

When the pressing rollers 44 and 44 are biased downward, as shown in FIG. 8, the receive rollers 32, 32, . . . rotatably supported by the second-group moving frame 26 are pressed against the lower ends of the openings of the guide holes for the second group 41a, 41a . . . formed in the fourth-group moving frame 38.

The rotatable campins 43 and 43 of the fourth-group movable unit 37 slidably engage with the cam holes for the fourth group 21b and 21b in the cam ring 19. Therefore, when the cam ring 19 rotates, the rotatable cam pins 43 and 43 change their positions relative to the cam holes for the fourth group 21b and 21b, and the guide holes for the second group 41a, 41a . . . follow the receive rollers 32, 32, . . . . The fourth-group movable unit 37 thus moves in the optical axis direction.

When the fourth-group movable unit 37 is moved in the optical axis direction, the pressing rollers 44 and 44 and the receive rollers 32, 32, . . . are rotated while the pressing rollers 44 and 44 are pressed against the second-group moving frame 26. Hence the receive rollers 32, 32, . . . are pressed against the lower ends of the openings of the guide holes for the second group 41a, 41a, . . . . When the second-group movable unit 25 is moved in the optical axis direction as well, the pressing rollers 44 and 44 and the receive rollers 32, 32, . . . are rotated while the pressing rollers 44 and 44 are pressed against the second-group moving frame 26. Hence the receive rollers 32, 32, . . . are pressed against the lower ends of the openings of the guide holes for the second group 41a, 41a, . . . .

In the above operations, the fourth-group movable unit 37 serves as a first movable unit, and the second-group movable unit 25 serves as a second movable unit. The fourth-group moving frame 38 and the group of lenses 39 in the fourth-group movable unit 37, which serves as the first movable unit, serve as a first moving frame and a first group of lenses, respectively. The second-group moving frame 26 and the group of lenses 27 in the second-group movable unit 25 that serves as the second movable unit, serve as a second moving frame and a second group of lenses, respectively.

The magnitude of the biasing force (spring force) of each of the biasing springs 45 and 45 roughly needs to be set so as not to cause an inclination between the second-group movable unit 25 and the fourth-group movable unit 37. For example, the desired magnitude of the biasing force is approximately three times the weight of the second-group movable unit 25. However, it is possible to arbitrarily determine the magnitude, for example, in consideration of the size of the space for disposing the biasing springs 45 and 45 and the impact of the inclination on the image quality.

When the second-group movable unit 25 and the fourth-group movable unit 37 are moved in the optical axis direction, the biasing portions 46a, 46a, . . . of the first flat springs 46 and 46 of the biasing springs 45 and 45 slidably come into contact with the rotating pressing rollers 44 and 44. Since the biasing portions 46a, 46a, . . . slidably come into contact with the shafts 44b, 44b, . . . , having smaller outer diameters, the biasing springs 45 and 45 do not unduly prevent the rotation of the pressing rollers 44 and 44, and the loss due to the sliding motion is small accordingly. It is therefore possible to ensure a smooth rotation of the pressing rollers 44 and 44.

Since the pressing rollers 44 and 44 include the slidable projections 44c, 44c, . . . jutting out sideways from the roller portions 44a and 44a, the slidable projections 44c, 44c, . . . slidably come into contact with the ends of the openings of the roller support holes 42 and 42 when the pressing rollers 44 and 44 rotate. Since the outer diameters of the slidable projections 44c, 44c, . . . are smaller than those of the roller portions 44a and 44a, the areas that come into contact with the ends of the openings of the roller support holes 42 and 42 are small when the pressing rollers 44 and 44 rotate, and the loss due to the sliding motion is small accordingly. It is therefore possible to ensure a smooth rotation of the pressing rollers 44 and 44.

The fourth-group movable unit 37 and the second-group movable unit 25 could be slightly inclined to the optical axis when the fourth-group movable unit 37 and the second-group movable unit 25 are moved in the optical axis direction. Even when such an inclination occurs, the fourth-group movable unit 37 and the second-group movable unit 25 are inclined as a whole in the same direction and by the same angle because the receive rollers 32, 32, . . . are pressed against the lower ends of the openings of the guide holes for the second group 41a, 41a, . . . .

Even when the fourth-group movable unit 37 and the second-group movable unit 25 are slightly inclined to the optical axis, they are inclined in the same direction and by the same angle as described above, and the group of lenses 39 and the group of lenses 27 have sensitivities of opposite directions but substantially the same magnitude, so that the inclination is unlikely to degrade the image quality.

As described above, the receive rollers 32, 32, . . . supported by the second-group moving frame 26 not only rotates while being pressed against the fourth-group moving frame 38, but also serves as guiding means when the fourth-group movable unit 37 is moved in the optical axis direction. On the other hand, the guide holes for the second group 41a, 41a, . . . formed in the fourth-group moving frame 38 not only are pressed by the receive rollers 32, 32, . . . but also serve as guiding means when the second-group movable unit 25 is moved in the optical axis direction.

The housing 4 also houses a focus motor 50, for example, an ultrasonic motor, at a position close to the rear end of the housing 4. The focus motor 50 is driven for focusing in the autofocus mode.

In the thus configured imaging apparatus 1, when focusing or zooming is performed, the cam ring 19 is rotated and at least one of the first-group movable unit 22, the second-group movable unit 25, the third-group movable unit 33, and the fourth-group movable unit 37 is moved in the optical axis direction. In the imaging apparatus 1, for example, when the zooming is performed from the wide angle-side to the telephoto-side, the first-group movable unit 22 is first moved rearward (toward the image plane side) and then forward (toward the subject side), and the second-group movable unit 25, the third-group movable unit 33, and the fourth-group movable unit 37 are moved rearward. In this operation, the fourth-group movable unit 37 moves the most and the second-group movable unit 25 moves the least. The amount of movement of the third-group movable unit 33 is in between the other two.

As described above, in the imaging apparatus 1, the biasing springs 45 and 45 press the pressing rollers 44 and 44 against the second-group moving frame 26, which serves as the second moving frame, and hence the receive rollers 32, 32, . . . are supported by the second-group moving frame 26 against the fourth-group moving frame 38, which serves as the first moving frame, so that the second-group moving frame 26 and the fourth-group moving frame 38 are moved in the optical axis direction while the pressing rollers 44 and 44 and the receive rollers 32, 32, . . . are rotated. It is therefore possible to ensure a smooth motion of the second-group moving frame 26 and the fourth-group moving frame 38.

Further, the second-group movable unit 25 and the fourth-group movable unit 37 will not be inclined relative to each other, but may only be inclined as a whole with respect to the optical axis. The second-group movable unit 25 and the fourth-group movable unit 37 thus will not be independently inclined to the optical axis, allowing the inclination of the second-group movable unit 25 and the fourth-group movable unit 37 with respect to the optical axis is significantly small, and the image quality can be improved accordingly.

Moreover, since the receive rollers 32, 32, . . . supported by the second-group moving frame 26 serve as guiding means when the fourth-group movable unit 37 moves in the optical axis direction, and the guide holes for the second group 41a, 41a, formed in the fourth-group moving frame 38 serve as guiding means when the second-group movable unit 25 moves in the optical axis direction. Since no other dedicated guiding means is necessary, the mechanism can be simplified.

Further, in the lens barrel 3, since the receive rollers 32, 32, . . . are provided at a plurality of locations spaced apart in the optical axis direction (front-rear direction), the second-group movable unit 25 and the fourth-group movable unit 37 are unlikely to be inclined to the optical axis in the front-rear direction. It is therefore possible to improve the stability of the motion of the second-group movable unit 25 and the fourth-group movable unit 37 and hence to improve the image quality. The distance between the receive rollers 32, 32, . . . in the optical axis direction is desirably set to a large value from the viewpoint of preventing the generation of inclination in the front-rear direction.

Moreover, in the lens barrel 3, since the receive rollers 32, 32, . . . are provided at a plurality of locations spaced apart in a direction perpendicular to the optical axis (right-left direction), the second-group movable unit 25 and the fourth-group movable unit 37 are unlikely to be inclined to the optical axis in the right-left direction. It is therefore possible to improve the stability of the motion of the second-group movable unit 25 and the fourth-group movable unit 37 and hence to improve the image quality.

Figure 9:
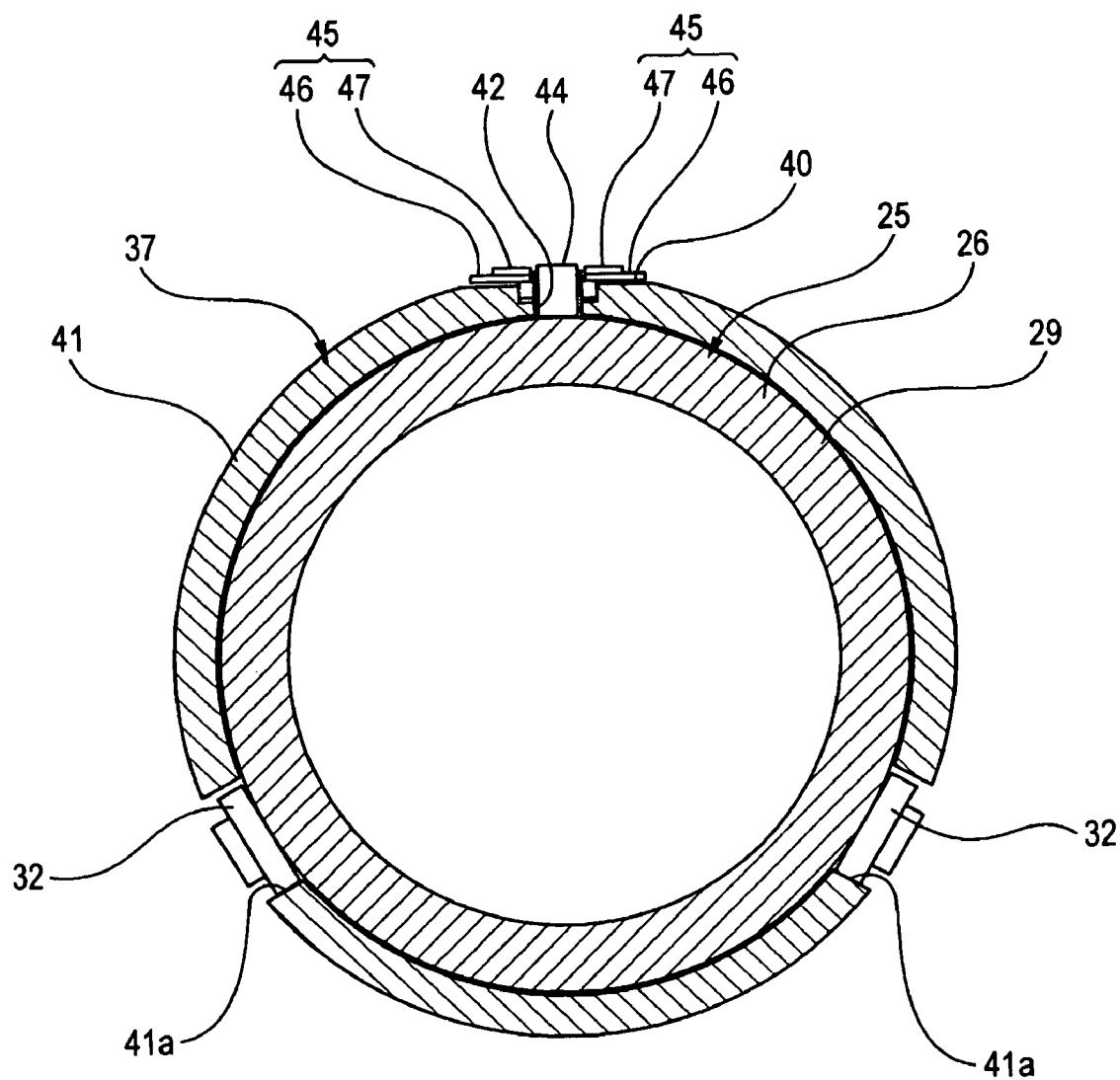
FIG. 9 is a conceptual view showing the positional relationship between the pressing roller and the receive rollers.

Further, in the lens barrel 3, the pressing roller 44 and the receive rollers 32 and 32 are evenly spaced apart (120°) in the circumferential direction, as shown in FIG. 9. Therefore, the biasing spring 45 can exert the downward biasing force equally on the receive rollers 32, 32, . . . via the pressing roller 44. Further, even when one pressing roller 44 presses the second-group moving frame 26 downward, the pressing force can be evenly distributed both in the horizontal and vertical directions. It is therefore possible to ensure a stable motion of the second-group movable unit 25 and the fourth-group movable unit 37.

The above description has been made with reference to the case where the receive rollers 32, 32, . . . supported by the second-group movable unit 25 are pressed against the ends of the openings of the guide holes for the second group 41a, 41a, ... formed in the fourth-group movable unit 37. Conversely, the receive rollers may be supported by the fourth-group movable unit 37, and the receive rollers may be pressed against the ends of the openings of guide holes formed in the second-group movable unit 25.

The above description has been made with reference to the case where two pressing rollers 44 and 44 and four receive rollers 32, 32, ... are provided. The number of pressing rollers 44 and the number of receive rollers 32 are not limited thereto, and can be set arbitrarily.

The above description has been made with reference to the case where the pressing rollers 44 and 44 are located on the upper side and the receive rollers 32, 32, ... are located on the lower side. The locations of the pressing rollers 44 and 44 and the receive rollers 32, 32, ... are not limited thereto, and can be set arbitrarily.

The above description has been given with reference to the case where the pressing rollers 44 and 44 are supported by the fourth-group movable unit 37, which serves as the first movable unit, and the receive rollers 32, 32, ... are supported by the second-group movable unit 25, which serves as the second movable unit. The pressing rollers 44 and 44 and the receive rollers 32, 32, ... are not necessarily supported by the fourth-group movable unit 37 and the second-group movable unit 25, but the combination of the first and second movable units that support the pressing rollers 44 and 44 and the receive rollers 32, 32, ... may be any combination of the first-group movable unit 22, the second-group movable unit 25, the third-group movable unit 33, and the fourth-group movable unit 37, each of which moves in the optical axis direction.

The specific shapes and structures of the various portions shown in the best mode described above are only by way of specific examples to implement the invention, and the technical extent of the invention should not construed in a limiting sense according thereto.

It should be understood by those skilled in the art that various modifications, combinations, subcombinations and alterations may occur depending on design requirements and other factors insofar as they are within the scope of the appended claims or the equivalents thereof.

What is claimed is:

1. A lens barrel in which a plurality of movable units, each including a group of lenses, are moved in the optical axis direction when a cam ring is rotated relative to a stationary ring around the optical axis, the lens barrel comprising:
    a first movable unit including a first group of lenses and a first moving frame that holds the first group of lenses, the first moving frame having a roller support hole formed therein;
    a second movable unit including a second group of lenses and a second moving frame that holds the second group of lenses, the second moving frame disposed inside the first moving frame;
    a pressing roller supported in the roller support hole in the first moving frame in such a way that the pressing roller is rotatable around an axis perpendicular to the optical axis, the pressing roller being rotated when the first or second movable unit is moved in the optical axis direction;
    a biasing spring attached to the outer surface of the first moving frame, the biasing spring pressing the pressing roller against the outer surface of the second moving frame; and
    a receive roller supported by the first or second moving frame in such a way that the receive roller is rotatable around an axis perpendicular to the optical axis, the receive roller being pressed by the biasing force of the biasing spring against the second or first moving frame and being rotated when the first or second moving frame is moved in the optical axis direction.

2. The lens barrel according to claim 1, wherein the first and second groups of lenses have sensitivities of opposite directions but substantially the same magnitude.

3. The lens barrel according to claim 1, wherein the first or second moving frame has a guide hole against which the rotating receive roller is pressed, the guide hole extending in the optical axis direction and guiding the motion of the second or first moving frame in the optical axis direction.

4. The lens barrel according to claim 1, wherein the pressing roller includes a cylindrical roller portion that comes into contact with the second moving frame and a pair of shafts jutting out in opposite directions from the central portions of the side surfaces of the roller portion, and
    the biasing spring comes into contact with the outer circumferential surfaces of the pair of shafts so that the pressing roller is biased toward the second moving frame.

5. The lens barrel according to claim 4, wherein the pressing roller includes disk-shaped slidable projections jutting out in opposite directions from the side surfaces of the roller portion, each of the slidable projections being slidable on an end of the opening of the roller support hole in the first moving frame, and
    the amount of projection of the slidable projection from the roller portion is smaller than the amount of projection of the shaft, and the diameter of the slidable projection is smaller than the diameter of the roller portion but greater than the diameter of the shaft.

6. The lens barrel according to claim 1, wherein the biasing spring includes a first flat spring and a second flat spring, and
    the first and second flat springs are overlaid in the thickness direction.

7. The lens barrel according to claim 1, wherein the cam ring is shaped into a substantially cylindrical form,
    the first moving frame includes a cylindrical portion and a flat portion connected to the cylindrical portion in the circumferential direction,
    the portion of the first moving frame that includes at least the flat portion is disposed inside the cam ring, and
    the flat portion is a spring attachment portion to which the biasing spring is attached.

8. The lens barrel according to claim 7, wherein the biasing spring includes a first flat spring and a second flat spring, the outer shape of which is smaller than the outer shape of the first flat spring,
    the first flat spring is disposed in such a way that the first flat spring is in contact with the spring attachment portion, and
    the second flat spring is overlaid on the first flat spring in the thickness direction.

9. The lens barrel according to claim 1, wherein a plurality of receive rollers are provided at locations spaced apart in the optical axis direction.

10. The lens barrel according to claim 1, wherein a plurality of receive rollers are provided at locations spaced apart in a direction perpendicular to the optical axis.

11. An imaging apparatus comprising a lens barrel in which a plurality of movable units, each including a group of lenses, are moved in the optical axis direction when a cam ring is rotated relative to a stationary ring around the optical axis,
wherein the lens barrel includes
a first movable unit including a first group of lenses and a first moving frame that holds the first group of lenses, the first moving frame having a roller support hole formed therein,
a second movable unit including a second group of lenses and a second moving frame that holds the second group of lenses, the second moving frame disposed inside the first moving frame,
a pressing roller supported in the roller support hole in the first moving frame in such a way that the pressing roller is rotatable around an axis perpendicular to the optical axis, the pressing roller being rotated when the first or second movable unit is moved in the optical axis direction,
a biasing spring attached to the outer surface of the first moving frame, the biasing spring pressing the pressing roller against the outer surface of the second moving frame, and
a receive roller supported by the first or second moving frame in such a way that the receive roller is rotatable around an axis perpendicular to the optical axis, the receive roller being pressed by the biasing force of the biasing spring against the second or first moving frame and being rotated when the first or second moving frame is moved in the optical axis direction.

* * * * *